United States Patent
Li et al.

(10) Patent No.: US 10,301,516 B2
(45) Date of Patent: May 28, 2019

(54) METHOD FOR PREPARING POLYESTER HOT MELT ADHESIVE WITH HIGH VISCOSITY AND LOCALLY SENSITIVE VISCOSITY-TEMPERATURE PROPERTY

(71) Applicants: KUNSHAN TIANYANG HOT MELT ADHESIVE CO., LTD., Jiangsu (CN); SHANGHAI TIANYANG HOT MELT ADHESIVE CO., LTD., Shanghai (CN); EAST CHINA UNIVERSITY OF SCIENCE AND TECHNOLOGY, Shanghai (CN)

(72) Inventors: Zhelong Li, Shanghai (CN); Wanyu Zhu, Shanghai (CN); Heji Lei, Shanghai (CN); Fangqun Wu, Shanghai (CN); Zuoxiang Zeng, Shanghai (CN)

(73) Assignees: KUNSHAN TIANYANG HOT MELT ADHESIVE CO., LTD, Jiangsu (CN); SHANGHAI TIANYANG HOT MELT ADHESIVE CO., LTD, Shanghai (CN); EAST CHINA UNIVERSITY OF SCIENCE AND TECHNOLOGY, Shanghai (CN)

( * ) Notice: Subject to any disclaimer, the term of this patent is extended or adjusted under 35 U.S.C. 154(b) by 125 days.

(21) Appl. No.: 15/327,920

(22) PCT Filed: Jul. 20, 2015

(86) PCT No.: PCT/CN2015/084459
§ 371 (c)(1),
(2) Date: Jan. 20, 2017

(87) PCT Pub. No.: WO2016/011923
PCT Pub. Date: Jan. 28, 2016

(65) Prior Publication Data
US 2017/0204309 A1 Jul. 20, 2017

(30) Foreign Application Priority Data
Jul. 22, 2014 (CN) .......................... 2014 1 0348224

(51) Int. Cl.
*C09J 167/02* (2006.01)
*C09J 11/06* (2006.01)
*C08G 63/672* (2006.01)

(52) U.S. Cl.
CPC .......... *C09J 167/02* (2013.01); *C08G 63/672* (2013.01); *C09J 11/06* (2013.01)

(58) Field of Classification Search
CPC ................................ C09J 167/02; C09J 11/06
USPC ........................................................ 524/710
See application file for complete search history.

(56) References Cited

U.S. PATENT DOCUMENTS 6,465,104 B1 * 10/2002 Krebs .................... C08G 18/12
156/331.4
2002/0157780 A1 * 10/2002 Onusseit
2014/0256875 A1 * 9/2014 Li et al.

FOREIGN PATENT DOCUMENTS

| CN | 1317030 A | 10/2001 |
|---|---|---|
| CN | 103184027 A | 7/2013 |
| CN | 104119829 A | 10/2014 |
| WO | WO 2012013650 | 2/2012 |

\* cited by examiner

*Primary Examiner* — Kregg Brooks
*Assistant Examiner* — Henry Hu
(74) *Attorney, Agent, or Firm* — Muncy, Geissler, Olds & Lowe, P.C.

(57) ABSTRACT

A method for preparation of a high-viscosity polyester hot-melt adhesive with a partially sensitive viscosity-temperature property is disclosed, including the steps of: i) subjecting terephthalic acid, isophthalic acid, dodecanedioic acid, adipic acid, butanediol, dipropylene glycol and hexanediol to an esterification reaction in the presence of tetrabutyl titanate serving as a catalyst; and ii) adding an antioxidant to a product resulting from step i) to conduct a polycondensation reaction under a reduced pressure so as to obtain the high-viscosity polyester hot-melt adhesive which has a low melting point of 130° C.-135° C. and a partially sensitive viscosity-temperature property.

3 Claims, No Drawings

US 10,301,516 B2

METHOD FOR PREPARING POLYESTER HOT MELT ADHESIVE WITH HIGH VISCOSITY AND LOCALLY SENSITIVE VISCOSITY-TEMPERATURE PROPERTY

TECHNICAL FIELD

The present invention relates to the preparation of polyester hot-melt adhesives and, more particularly, to a method for the preparation of a low-melting-point, high-viscosity polyester hot-melt adhesive with the viscosity experiencing a remarkable reduction within a specific temperature range.

BACKGROUND

Preparation of a high-viscosity polyester by secondary processing on a corresponding low-viscosity polyester tends to require a complex process. For example, Chinese Patent Pub. No. CN1317030A describes a process in which a low-viscosity polyester is produced and mixed with oxazoline to form a matrix which is then blended with a high-viscosity polyester for subsequent processing. This process is cumbersome and the used oxazoline is biologically and environmentally hazardous. In order to overcome such shortcomings of the prior art, the present invention provides a method for preparation of a polyester hot-melt adhesive which has a low melting point of 130° C.-135° C., a high viscosity of 700-750 Pa·s (at 160° C.), and a partially sensitive viscosity-temperature property.

SUMMARY OF THE INVENTION

The present invention provides a method for preparation of a high-viscosity polyester hot-melt adhesive with a partially sensitive viscosity-temperature property, including the steps of:

1) adding a dibasic acid, a dihydric alcohol and a catalyst in a predetermined ratio in an esterification reactor to conduct an esterification reaction at a temperature of from 140° C. to 200° C. and terminating the esterification reaction when the amount of distillation of water reaches greater than 93% of a theoretical amount; and 2) adding an antioxidant in a product obtained from step 1), and conducting a polycondensation reaction under a reduced pressure at 240° C.-245° C. and 50 Pa-80 Pa for 1.0 hour to produce the high-viscosity polyester hot-melt adhesive with the partially sensitive viscosity-temperature property in which viscosity drops by 75%-80% when the temperature is raised from 160° C. to 170° C.

The dibasic acid is a mixture of terephthalic acid, isophthalic acid, butanedioic acid, dodecanedioic acid and adipic acid.

The dihydric alcohol is a mixture of butanediol, dipropylene glycol and hexanediol.

The dibasic acid and the dihydric alcohol are present in a molar ratio of 1:1.50.

The terephthalic acid and the isophthalic acid are in a molar ratio of 1:0.10 to 1:0.15.

The terephthalic acid and the butanedioic acid are in a molar ratio of 1:0.20 to 1:0.30.

The terephthalic acid and the dodecanedioic acid are in a molar ratio of 1:0.1 to 1:0.25.

The terephthalic acid and the adipic acid are in a molar ratio of 1:0.40 to 1:0.50.

The butanediol and the dipropylene glycol are in a molar ratio of 1:0.20 to 1:0.60.

The butanediol and the hexanediol are in a molar ratio of 1:0.30 to 1:0.70.

The antioxidant is one selected from the group consisting of trimethyl phosphate, Antioxidant 168 and Antioxidant 1010.

The catalyst may be tetrabutyl titanate in an amount accounting for 0.03%-0.06% by weight of the dibasic acid.

The antioxidant may be in an amount accounting for 0.5%-0.8% by weight of the dibasic acid.

The novelty of the present invention lies in that a high-viscosity polyester hot-melt adhesive having a melting point of 130° C.-135° C. and a partially sensitive viscosity-temperature property can be produced from a particular composition of the raw materials using the simple esterification process.

Performance Tests: performance of the products produced in the following embodiment and comparative examples were tested according to the following standards: melting points—ISO 11357; and viscosities—China National Standard GB/T 7193.1-1987.

The polyester hot-melt adhesive according to the present invention has good fluidity and leveling properties when applied at a temperature of 170° C. or higher. During the cooling, its viscosity will undergo an instantaneous increase at a temperature of about 160° C., accordingly providing an instantaneously increased adhesion between the objects to which it is applied and thus preventing displacement therebetween under the effect of any external force. The polyester hot-melt adhesive according to the present invention can be directly used for, or used to produce films that are useful in, adhesion in the fields of clothing, shoe materials, heat transfer printing, trademarks, carpets, wood and the like.

DETAILED DESCRIPTION

The present invention is described in further detail below with reference to the following embodiment examples which, however, do not limit the invention in any sense.

Example 1

In a reactor of 1 L equipped with an agitator, a temperature measurement system, a rectifying column and a reflux condenser, 166.000 g (1.000 mol) of terephthalic acid, 19.920 g (0.120 mol) of isophthalic acid, 65.700 g (0.450 mol) of adipic acid, 34.500 g (0.150 mol) of dodecanedioic acid, 33.040 g (0.280 mol) of butanedioic acid, 135.000 g (1.500 mol) of butanediol, 120.600 g (0.900 mol) of dipropylene glycol, 70.800 g (0.600 mol) of hexanediol and 0.115 g of tetrabutyl titanate were added and gradually warmed up to 90° C., followed by initializing agitation. With the temperature approaching 140° C., distillation began at a temperature of 98° C.-102° C. The temperature is further raised to about 200° C., and the esterification reaction was terminated when the amount of distillation of water reaches greater than 93% of a theoretical amount.

After that, 1.717 g of Antioxidant 168 was further added to conduct a polycondensation reaction under a reduced pressure, and the temperature was gradually raised to and maintained at 242° C. Pressure in the reactor was then reduced to and maintained at 60 Pa for 1.0 hour, terminating the polycondensation reaction. Thereafter, nitrogen was introduced to eliminate the vacuum, followed by hot discharge into cold water, thereby obtaining white gel-like bars which were subsequently pelleted to obtain Product 2. The product was measured to have a melting point of 132° C.

using DSC (differential scanning calorimetry) devices. Additionally, the product was measured to have a viscosity of 709 Pa·s at 160° C. and a viscosity of 146 Pa·s at 170° C., in accordance with the aforementioned standards.

Example 2

In a reactor of 1 L equipped with an agitator, a temperature measurement system, a rectifying column and a reflux condenser, 166.000 g (1.000 mol) of terephthalic acid, 16.600 g (0.100 mol) of isophthalic acid, 66.700 g (0.450 mol) of adipic acid, 57.500 g (0.250 mol) of dodecanedioic acid, 29.500 g (0.250 mol) of butanedioic acid, 135.000 g (1.500 mol) of butanediol, 110.550 g (0.825 mol) of dipropylene glycol, 88.500 g (0.750 mol) of hexanediol and 0.123 g of tetrabutyl titanate were added and gradually warmed up to 90° C., followed by initializing agitation. With the temperature approaching 140° C., distillation began at a temperature of 98° C.-102° C. The temperature is further raised to about 200° C., and the esterification reaction was terminated when the amount of distillation of water reaches greater than 93% of a theoretical amount.

Thereafter, 2.141 g of Antioxidant 168 was further added to conduct a polycondensation reaction under a reduced pressure, and the temperature was gradually raised to and maintained at 240° C. Pressure in the reactor was then reduced to and maintained at 60 Pa for 1.0 hour, terminating the polycondensation reaction. Thereafter, nitrogen was introduced to eliminate the vacuum, followed by hot discharge into cold water, thereby obtaining white gel-like bars which were subsequently pelleted to obtain Product 3. The product was measured to have a melting point of 130° C. using DSC devices. Additionally, the product was measured to have a viscosity of 730 Pa·s at 160° C. and a viscosity of 151 Pa·s at 170° C., in accordance with the aforementioned standard.

Example 3

In a reactor of 1 L equipped with an agitator, a temperature measurement system, a rectifying column and a reflux condenser, 166.000 g (1.000 mol) of terephthalic acid, 21.580 g (0.130 mol) of isophthalic acid, 58.400 g (0.400 mol) of adipic acid, 39.100 g (0.170 mol) of dodecanedioic acid, 23.600 g (0.200 mol) of butanedioic acid, 135.000 g (1.500 mol) of butanediol, 40.200 g (0.300 mol) of dipropylene glycol, 123.900 g (1.050 mol) of hexanediol and 0.143 g of tetrabutyl titanate were added and gradually warmed up to 90° C., followed by initializing agitation. With the temperature approaching 140° C., distillation began at a temperature of 98° C.-102° C. The temperature is further raised to about 200° C., and the esterification reaction was terminated when the amount of distillation of water reaches greater than 93% of a theoretical amount.

Thereafter, 1.853 g of Antioxidant 168 was further added to conduct a polycondensation reaction under a reduced pressure, and the temperature was gradually raised to and maintained at 244° C. Pressure in the reactor was then reduced to and maintained at 60 Pa for 1.0 hour, terminating the polycondensation reaction. Thereafter, nitrogen was introduced to eliminate the vacuum, followed by hot discharge into cold water, thereby obtaining white gel-like bars which were subsequently pelleted to obtain Product 4. The product was measured to have a melting point of 133° C. using DSC devices. Additionally, the product was measured to have a viscosity of 740 Pa·s at 160° C. and a viscosity of 161 Pa·s at 170° C., in accordance with the aforementioned standard.

Comparative Example 1

In a reactor of 1 L equipped with an agitator, a temperature measurement system, a rectifying column and a reflux condenser, 166.000 g (1.000 mol) of terephthalic acid, 58.100 g (0.350 mol) of isophthalic acid, 87.600 g (0.600 mol) of adipic acid, 46.000 g (0.200 mol) of dodecanedioic acid, 29.500 g (0.250 mol) of butanedioic acid, 135.000 g (1.500 mol) of butanediol, 140.700 g (1.050 mol) of dipropylene glycol, 123.900 g (1.050 mol) of hexanediol and 0.107 g of tetrabutyl titanate were added and gradually warmed up to 90° C., followed by initializing agitation. With the temperature approaching 140° C., distillation began at a temperature of 98° C.-102° C. The temperature is further raised to about 200° C., and the esterification reaction was terminated when the amount of distillation of water reaches greater than 93% of a theoretical amount.

Thereafter, 2.861 g of Antioxidant 168 was further added to conduct a polycondensation reaction under a reduced pressure, and the temperature was gradually raised to and maintained at 240° C. Pressure in the reactor was then reduced to and maintained at 60 Pa for 1.0 hour, terminating the polycondensation reaction. Thereafter, nitrogen was introduced to eliminate the vacuum, followed by hot discharge into cold water, thereby obtaining white gel-like bars which were subsequently pelleted to obtain Product C1. The product was measured to have a melting point of 148° C. using DSC devices. Additionally, the product was measured to have a viscosity of 210 Pa·s at 160° C. and a viscosity of 181 Pa·s at 170° C., in accordance with the aforementioned standard.

The foregoing description is merely a basic illustration based on the concept of the present invention, and any equivalent variations made in accordance with the subject matter of the invention is considered to fall within the scope thereof.

The invention claimed is:
1. A method for preparation of a high-viscosity polyester hot-melt adhesive with a partially sensitive viscosity-temperature property, comprising the steps of:
   1) adding a dibasic acid mixture, a dihydric alcohol mixture and a catalyst in a predetermined ratio in an esterification reactor to conduct an esterification reaction at a temperature of from 140° C. to 200° C. and terminating the esterification reaction when an amount of distillation of water reaches greater than 93% of a theoretical amount; and
   2) adding an antioxidant in a product obtained from step 1) to conduct a polycondensation reaction under a reduced pressure at 240° C.-245° C. and 50 Pa-80 Pa for 1.0 hour to produce the high-viscosity polyester hot-melt adhesive with the partially sensitive viscosity-temperature property which has a viscosity of 700 Pa·s-750 Pa·s at 160° C. and the viscosity drops by 75%-80% when the temperature is raised from 160° C. to 170° C., the viscosity being tested according to China national standard GB/T 7193.1-1987, wherein:
   the dibasic acid mixture is a mixture of terephthalic acid, isophthalic acid, butanedioic acid, dodecanedioic acid and adipic acid;
   the dihydric alcohol mixture is a mixture of butanediol, dipropylene glycol and hexanediol;

the dibasic acid mixture and the dihydric alcohol mixture are present in a molar ratio of 1:1.50;
the terephthalic acid and the isophthalic acid are in a molar ratio of 1:0.10 to 1:0.15;
the terephthalic acid and the butanedioic acid are in a molar ratio of 1:0.20 to 1:0.30;
the terephthalic acid and the dodecanedioic acid are in a molar ratio of 1:0.1 to 1:0.25;
the terephthalic acid and the adipic acid are in a molar ratio of 1:0.40 to 1:0.50;
the butanediol and the dipropylene glycol are in a molar ratio of 1:0.20 to 1:0.60;
the butanediol and the hexanediol are in a molar ratio of 1:0.30 to 1:0.70; and
the antioxidant is one selected from the group consisting of trimethyl phosphate, Antioxidant 168 and Antioxidant 1010 wherein Antioxidant 168 is tris-(2,4-di-tert-butylphenyl)phosphite, while Antioxidant 1010 is pentaerythritol tetrakys 3-(3,5-di-tert-butyl-4-hydroxyphenyl)propionate.

2. The method according to claim 1, wherein the catalyst is tetrabutyl titanate in an amount accounting for 0.03%-0.06% by weight of the dibasic acid mixture.

3. The method according to claim 1, wherein the antioxidant is in an amount accounting for 0.5%-0.8% by weight of the dibasic acid mixture.

* * * * *